UNITED STATES PATENT OFFICE.

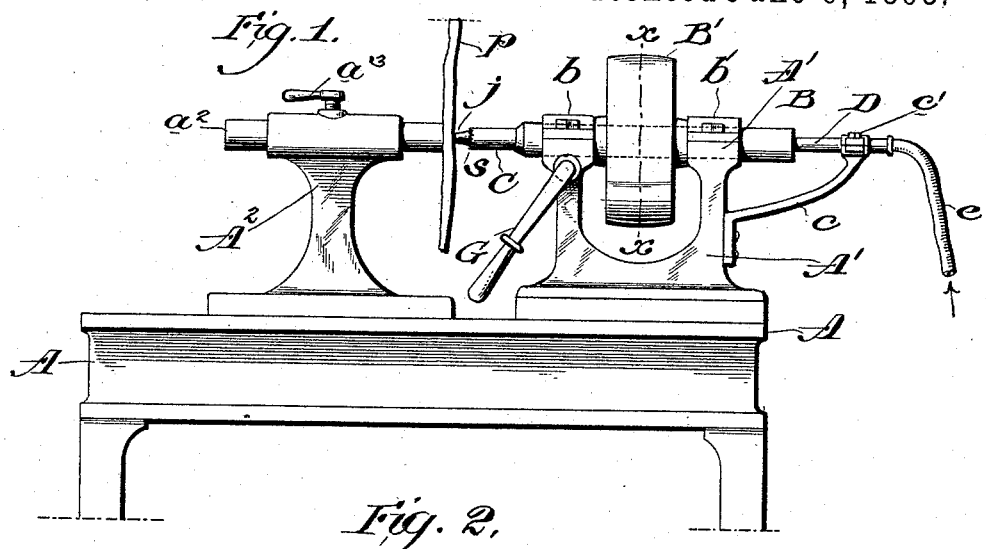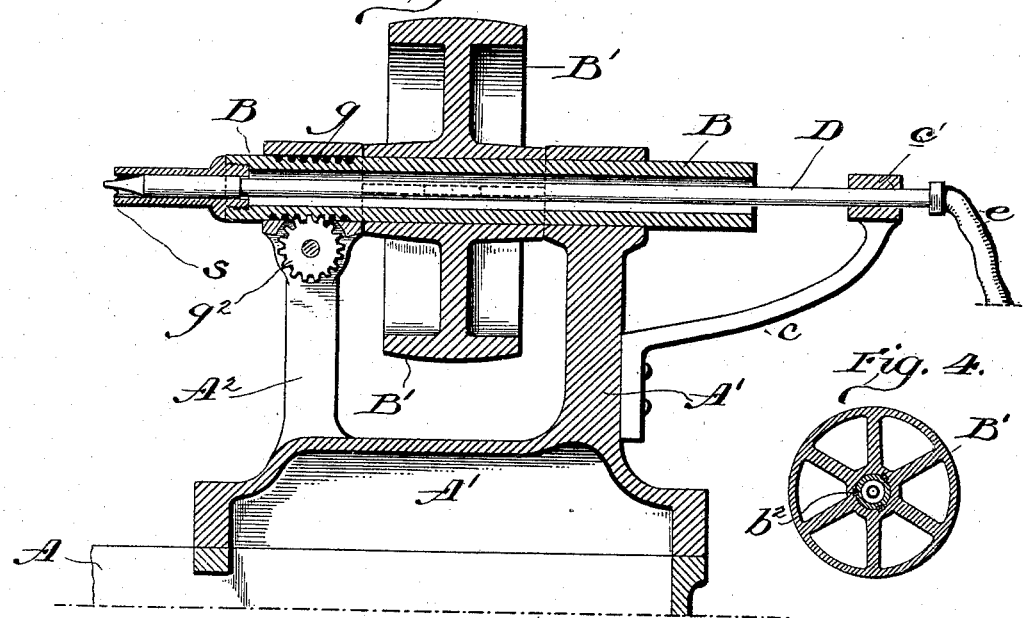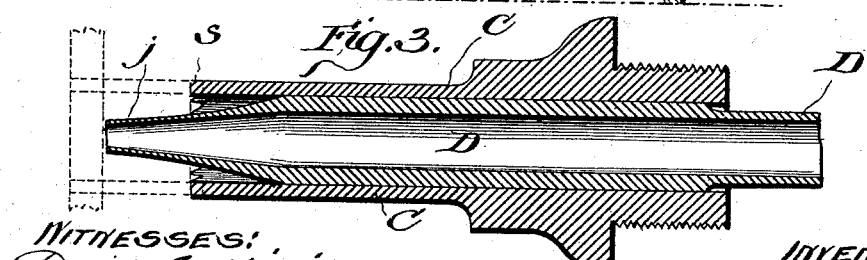

SAMUEL P. ORTH AND PATRICK O'DONOGHUE, OF PHILADELPHIA, PENNSYLVANIA.

DEVICE FOR CUTTING PEARL, &c.

SPECIFICATION forming part of Letters Patent No. 498,811, dated June 6, 1893.

Application filed September 21, 1892. Serial No. 446,423. (No model.)

*To all whom it may concern:*

Be it known that we, SAMUEL P. ORTH and PATRICK O'DONOGHUE, of the city of Philadelphia and State of Pennsylvania, have invented a certain new and useful Improvement in Devices for Cutting Pearl, &c.; and we do hereby declare the following to be a full, clear, and exact description thereof, reference being had to the accompanying drawings, forming part of this specification.

Our invention has relation to tools for cutting pearl, &c., and consists in the device hereinafter particularly described and claimed.

The object of our invention is to provide a device for cutting pearl and like material, principally into disks or buttons so constructed with a water jet centrally located within the cutting tool as to allow the material to be more readily cut with a finer finish, and at the same time obviate the necessity of the employment of superhardened tools and also to enable the tool to better retain its edge and require grinding less frequently, and the gage of the tool may be much finer.

In the accompanying drawings, in which similar letters of reference refer to similar parts throughout, Figure 1 is a front elevation of a lathe having our improved device applied thereto. Fig. 2 is a vertical section of a lathe head, tool and jet. Fig. 3 is an enlarged vertical section of the cutting tool and internal jet. Fig. 4 is a sectional view on the line $x-x$ of Fig. 1.

A is the main frame of the lathe having the lathe head frame, A', and the bearing block, A², mounted thereon.

In the bearing block, A², a horizontally adjustable block, $a^2$, is provided adapted to be retained in any desired position by the clamp, $a^3$, for holding the material to be operated upon in place.

In the lathe head frame, A', a horizontally disposed hollow shaft, B, is journaled in the journal bearings, $b, b'$, and between the journal bearings, $b, b'$, a belt pulley, B', is provided upon the said shaft, B; the hollowed shaft, B, is constructed so as to allow of a lateral as well as a rotative movement of the said shaft and is keyed or connected with the pulley, B', by a feather joint, longitudinal slots, as shown in Fig. 4, being provided in the shaft, B, into which a feather, $b^2$, provided on the pulley B', engages, or the opposite construction may be employed if desired. Various constructions may be employed to accomplish this lateral movement of the shaft, as for instance, the journal bearings, $b, b'$, may be further separated and the belt pulley, B', rigidly secured to the shaft, B, and the pulley and shaft laterally shifted together to the required extent.

To the inner end of the hollowed shaft, B, a hollowed circular tool, C, is provided, secured thereto by screw threads or by any well known clamping device; the outer end of the tool, C, is provided with teeth or serrations to form a circular drill or saw, s, and is designed to revolve at the same speed as the shaft, B, driven by the pulley B'.

In the interior of the hollowed shaft, B, and tool, C, a tube or jet, D, is centrally provided with its mouth, $j$, preferably tapered and protruding without the tool, C; this tube, D, is preferably of an exterior diameter slightly less than the interior diameter of the bore of the shaft, B, and tool, C, so that the latter parts may freely revolve about the tube, D, without producing unnecessary friction; the tube, D, is constructed to be retained in a given rigid position, when adjusted as desired, preferably through the medium of the clamping arm, c, which is secured at one end to the lathe head, A', and at the other end to the outer end of the tube, D; this end of the tube, D, is connected with the water supply preferably by a flexible hose, e.

In order to advance and recede the tool, C, into and away from the material to be cut we provide a series of annular grooves, g, in the circumference of the shaft, B, into which is geared a serrated wheel, $g^2$, journaled upon the lathe head frame, A², and operated by the lever, G; a partial rotation of the wheel, $g^2$, in a given direction will thus advance the tool, C, toward and into the material while a rotation in the opposite direction will withdraw it.

Other well known mechanical constructions for advancing and receding the tool may also be employed, the above described construction being only shown as one of the means which may be used.

The operation of the device is substantially as follows:—The horizontal bearing block, $a^2$, is first properly adjusted through the medium of the clamp, $a^3$, upon the block, $A^2$, and the piece of pearl or other like material, $p$, to be cut from is then held by the hand in position against the bearing block, $a^2$; the tube shaft, D, is then adjusted to a position, substantially as shown in the drawings, very close to the face of the material, $p$, and secured in that position by a clamped nut, $c'$, on the arm, $c$; the belt pulley, B', is then started and the tool, C, thus set in operation and driven to the desired speed; the water then is turned on through the pipe, $e$, into the tube, D, and sprayed from the tapered jet, $j$, upon the material to be cut; the tool, C, is thereupon advanced upon the material, $p$, through the medium of the lever, G, until it cuts through the material cutting out a disk or button of pearl, or other material. When the lever, G, is reversed and the tool, C, withdrawn, the material, $p$, is then moved forward over the jet, $j$, and as it is rigidly secured in position the disk or button cut out is allowed to remain until freed from the edges of the surrounding material from which it is cut when it will drop to the bed of the lathe or into a receptacle provided for the purpose.

The centrally provided water tube or jet when the machine is in operation and spraying the water upon the material being cut tends to retain the nature of the pearl and to greatly accelerate the cutting of the material and provides a finer edge to the button. At the same time when the jet is used the edge of the cutting tool is not required to be of such a hardened character as when water is not employed. The central disposition of the jet within the hollowed tube keeps the water constantly fed to the cut during the operation by centrifugal force, whereas were the water applied by an external jet the same force would have a tendency to constantly throw it away from the cut. The point, $j$, of the tube, D, also operates, as previously described, as a means for dislodging or ejecting the disk or button when cut from the body of the material.

Our invention is designed principally for the manufacture of buttons or disks of pearl, or other like material though we do not limit ourselves to this use nor to the specific construction of parts herein described, as other constructions might be employed without deviating from the spirit of our invention.

Having thus described our invention, what we claim, and desire to secure by Letters Patent, is—

1. In a disk cutting lathe the horizontally disposed hollowed revoluble cutting tool having an annular cutting edge, a centrally disposed non-rotative water tube secured within said tool and means for driving said tool and shifting the same laterally.

2. In a disk cutting lathe a revoluble hollowed cutting tool, means for driving said tool and shifting the same laterally, the centrally disposed combined water tube and ejector adjustably secured within said hollowed tool, means for laterally adjusting said tube toward the material to be cut for retaining the disk.

3. In a disk cutting lathe the horizontally journaled hollow spindle, a revoluble cutting tool secured to said spindle having a longitudinal bore provided through the center of said tool continuous with the bore of the spindle, a combined water tube and ejector provided through the bore of said spindle and tool, means for laterally shifting said tube within the spindle and tool toward the material to be cut and means for driving said spindle and tool.

4. In a disk cutting lathe a hollow spindle, B, horizontally journaled in the journal bearings, $b$, $b'$, a hollow cutting tool, C, secured to said spindle, a combined water tube and ejector, D, provided through the bore of said spindle and tool having a point or jet, $s$, a flexible water supply tube, $e$, and means for laterally shifting said water tube, D, and for driving said spindle and tool.

5. In a disk cutting device having lathe head frame, A', and adjustable bearing block, $A^2$, provided thereon, hollow cylindrical shaft, B, and cylindrical tool, C, removably secured thereto, said shaft and tool rotatively and reciprocatingly journaled in the bearings, $b$, $b'$, belt pulley, B', provided upon the shaft, B, and keyed thereto to allow of lateral adjustment of the shaft, centrally disposed water tube, D, provided within the hollowed shaft, B and within the tool, C, adjustably secured to the frame, A', through the medium of the clamp, $c'$, and bracket, $c$; annular grooves, $g$, provided upon the shaft, B, and serrated wheel, $g^2$, journaled to the frame, $A^2$, and gearing in the annular grooves, $g$, lever, G, provided upon the serrated wheel, $g^2$, for operating the same in the manner and for the purpose substantially as described.

In witness whereof we have hereunto set our hands this 17th day of September, A. D. 1892.

SAMUEL P. ORTH.
PATRICK O'DONOGHUE.

Witnesses:
H. GORDON McCOUCH,
HORACE PETTIT.